United States Patent
Wei et al.

(10) Patent No.: US 10,281,265 B2
(45) Date of Patent: May 7, 2019

(54) METHOD AND SYSTEM FOR SCENE SCANNING

(71) Applicant: Industrial Technology Research Institute, Hsinchu (TW)

(72) Inventors: Chen-Hao Wei, Hsinchu (TW); Wen-Shiou Luo, Hsinchu (TW)

(73) Assignee: INDUSTRIAL TECHNOLOGY RESEARCH INSTITUTE, Chutung, Hsinchu (TW)

(*) Notice: Subject to any disclaimer, the term of this patent is extended or adjusted under 35 U.S.C. 154(b) by 91 days.

(21) Appl. No.: 15/377,381

(22) Filed: Dec. 13, 2016

(65) Prior Publication Data

US 2018/0077405 A1    Mar. 15, 2018

(30) Foreign Application Priority Data

Sep. 13, 2016 (TW) .............................. 105129754 A (51) Int. Cl.
H04N 1/04 (2006.01)
G06T 17/00 (2006.01)
G01B 11/25 (2006.01)

(52) U.S. Cl.
CPC ................ G01B 11/2513 (2013.01)

(58) Field of Classification Search
CPC . H04N 13/0253; H04N 13/0239; G06T 17/00
See application file for complete search history.

(56) References Cited

U.S. PATENT DOCUMENTS

| 7,010,158 | B2 | 3/2006 | Cahill et al. |
| 7,103,212 | B2* | 9/2006 | Hager ..................... G06K 9/32 |
| | | | 345/419 |
| 8,861,841 | B2 | 10/2014 | Bell et al. |
| 8,879,828 | B2 | 11/2014 | Bell et al. |
| 9,165,410 | B1 | 10/2015 | Bell et al. |
| 9,217,637 | B2 | 12/2015 | Heidemann et al. |
| 2005/0128196 | A1* | 6/2005 | Popescu ................. G01B 11/25 |
| | | | 345/420 |

(Continued)

FOREIGN PATENT DOCUMENTS

| CN | 102842148 A | 12/2012 |
| CN | 105427293 A | 3/2016 |

(Continued)

OTHER PUBLICATIONS

Peter Henry et al; "RGB-D mapping: Using Kinect-style depth cameras for dense 3D modeling of indoor environments", , The International Journal of Robotics Research, 2012; pp. 1-7.

(Continued)

Primary Examiner — Tsion B Owens
(74) Attorney, Agent, or Firm — Muncy, Geissler, Olds & Lowe, P.C.

(57) ABSTRACT

A scene scanning method and a scene scanning system, adapted to obtain information for reconstructing a 3D model, are provided. The method comprises projecting, by a characteristic projecting unit, a characteristic pattern by applying an invisible light in a scene; capturing, by a sensing unit, a data of the scene and the characteristic pattern; and receiving, by a processing unit, the data of the scene and characteristic pattern captured by the sensing unit.

16 Claims, 7 Drawing Sheets

(56) References Cited

U.S. PATENT DOCUMENTS

| | | | | |
|---|---|---|---|---|
| 2012/0287247 | A1* | 11/2012 | Stenger | H04N 13/0253 348/47 |
| 2013/0093881 | A1* | 4/2013 | Kuwabara | G01B 11/25 348/135 |
| 2014/0184751 | A1* | 7/2014 | Liou | H04N 13/0239 348/47 |
| 2016/0005234 | A1 | 1/2016 | Boivin et al. | |

FOREIGN PATENT DOCUMENTS

| | | | |
|---|---|---|---|
| TW | 200633519 | A | 9/2006 |
| TW | I413877 | B | 11/2013 |
| TW | 201426161 | A | 7/2014 |

OTHER PUBLICATIONS

Christian Häne et al; "Joint 3D Scene Reconstruction and Class Segmentation", 2013 IEEE Conference on Computer Vision and Pattern Recognition, 2013; pp. 97-104.

Sungjoon Choi et al, "Robust reconstruction of indoor scenes," 2015 IEEE Conference on Computer Vision and Pattern Recognition (CVPR), Boston, MA, Jun. 7-12, 2015, pp. 1-10.

R. A. Newcombe et al., "KinectFusion: Real-time dense surface mapping and tracking," Proceedings of the 2011 10th IEEE International Symposium on Mixed and Augmented Reality (ISMAR), Washington, DC, Oct. 26-29, 2011, pp. 1-10.

Qian-Yi Zhou et al; "Color Map Optimization for 3D Reconstruction with Consumer Depth Cameras", ACM Transactions on Graphics (TOG)—Proceedings of ACM SIGGRAPH 2014, vol. 33, Issue 4, Jul. 2014, Article No. 155, pp. 1-10, \* cited by examiner

METHOD AND SYSTEM FOR SCENE SCANNING

CROSS-REFERENCE TO RELATED APPLICATION

This application claims the priority benefits of Taiwan application serial no. 105129754, filed on Sep. 13, 2016. The entirety of each of the above-mentioned patent applications is hereby incorporated by reference herein.

TECHNICAL FIELD

The disclosure relates to a method and a system for scene scanning.

BACKGROUND

In the recent technologies, they usually reconstruct a three-dimensional (3D) scene model through a plurality of images and the corresponding depth information by a computer system. In order to register the reconstructed 3D scene model, it usually uses 3D shapes or 2D characteristics of the images and the depth information to perform the registration. However, when the 3D shapes are used to register the reconstructed 3D scene model, it suffers no shape variation on the reconstructed 3D scene model (for example, a plane). Or, when the 2D characteristics are used to register the reconstructed 3D scene model, the limitations of no characteristics or no repeating characteristics on the reconstructed 3D scene model often influence the result of the reconstructed 3D scene model.

In addition, when the field of a scene is larger than the field of view of the sensor, the scene needs to be scanned in batches to reconstruct the whole 3D scene model of the scene. The obtained depth data of the scene scanned in batches sometimes suffers the problem that there are no characteristics in the depth data, thereby failing to merge each depth data. This will influence the subsequent works of reconstructing the 3D scene model. Therefore, in recent technologies, there still exists the issue that the characteristic factors will influence the reconstruction of the 3D scene model.

SUMMARY

The embodiments of the disclosure provide a method and a system for scene scanning.

In an embodiment of the disclosure, a scene scanning method is adapted to obtain information for reconstructing a three-dimensional (3D) model. The method comprises: projecting, by a characteristic projecting unit, a characteristic pattern by applying an invisible light in a scene; capturing, by a sensing unit, a data of the scene and the characteristic pattern; and receiving, by a processing unit, the data of the scene and the characteristic pattern captured by the sensing unit.

In an embodiment of the disclosure, a scene scanning system is adapted to obtain information for reconstructing a three-dimensional (3D) model. The system comprising a characteristic projecting unit, a sensing unit and a processing unit. The characteristic projecting unit projects a characteristic pattern by applying an invisible light in a scene. The sensing unit captures a data of the scene and the characteristic pattern. The processing unit receives the data of the scene and the characteristic pattern captured by the sensing unit.

DESCRIPTION OF THE EMBODIMENTS

Figure 1:
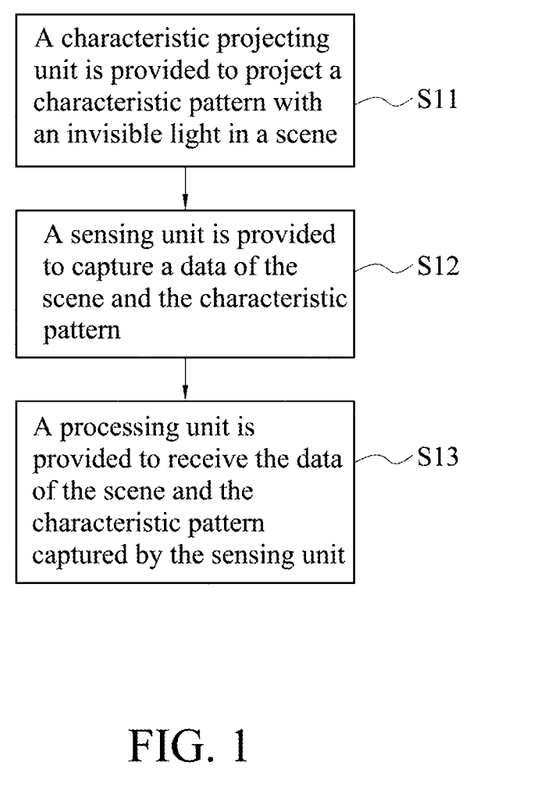
FIG. 1 is a flow chart of a scene scanning method according to an embodiment of the disclosure.
Figure 3:
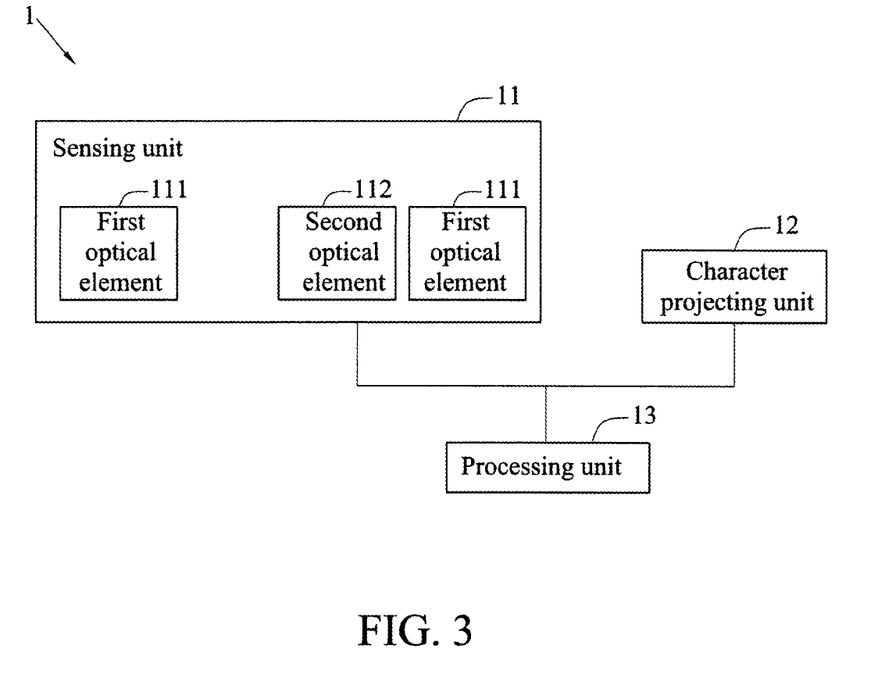
FIG. 3 is a schematic diagram of a scene scanning system according to an embodiment of the disclosure.

Referring to FIG. 1 and FIG. 3, the scene scanning system of the disclosure includes a characteristic projecting unit 12, a sensing unit 11 and a processing unit 13. The scene scanning system 1 is used to execute the scene scanning method of the disclosure. The followings will describe the scene scanning system 1 and the method of the disclosure in detail together.

In an embodiment of the scene scanning method of the disclosure, first a characteristic projecting unit 12 is provided to project a characteristic pattern with an invisible light in a scene (Step S11). Then a sensing unit 11 is provided to capture a data of the scene and the characteristic pattern (Step S12), wherein the data of the scene and the characteristic pattern include the depth information, and the detailed of the characteristic pattern will be described later. After capturing the data of the scene and the characteristic pattern, a processing unit 13 is provided to receive the data of the scene and the characteristic pattern captured by the sensing unit 11 (Step S13).

In an embodiment of the disclosure, the processing unit 13 is a hardware device containing a processor, such as a computer, a mobile phone, a tablet or a circuit board with a processor. The way of the processing unit 13 receiving the data may be realized by a wired or wireless connection, such as by a Universal Serial Bus (USB) cable connection, or by Bluetooth, infrared or other wireless connections, but the embodiments do not limit the scope of the disclosure.

In an embodiment of the disclosure, the characteristic projecting unit 12 is a projector that emits invisible light, such as infrared light. The sensing unit 11 comprises two first optical elements 111 and a second optical element 112, wherein the wavelength domain captured by those two first optical elements 111 is the same as the wavelength domain projected by the characteristic projecting unit 12. Therefore, those two first optical elements 111 may record the characteristic pattern projected by the characteristic projecting unit 12.

In an embodiment of the disclosure, those two first optical elements 111 are the combination of a projector and an image sensor. That means the sensing unit 11 may be an active depth sensor, such as the depth sensor of ultrasound, laser or structured light.

In another embodiment of the disclosure, those two first optical elements 111 are the combination of both image sensors. That means the sensing unit 11 may be a passive depth sensor. The sensing unit 11 of the disclosure is not limited to be an active or passive depth sensor. Due to the captured wavelength domain of those two first optical elements 111 is the same as that of the characteristic projecting unit 12, it may obtain the 3D coordinate position information of the characteristic pattern by the depth information sensed by those two first optical elements 111.

In the other embodiment of the disclosure, in order to obtain a 2D image with color information, the second optical element 112 may be an RGB camera. An RGB camera delivers the three basic color components (red, green, and blue) on three different wires. This type of camera often uses three independent CCD sensors to acquire the three color signals. RGB cameras are used for very accurate color image acquisitions. The characteristic projecting unit 12 may be mounted on a rotating mechanism, such as a turntable. And controlling the direction of the rotating mechanism may be by a controller, thereby realizing the function of rotating the characteristic projecting unit 12.

Figure 4A:
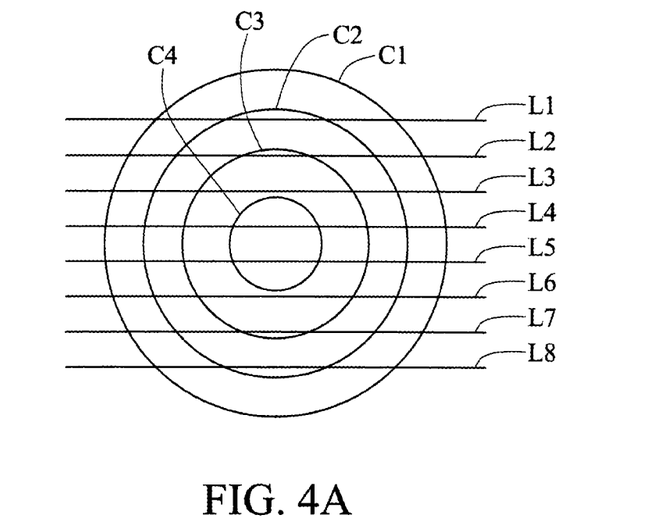
FIG. 4A is a schematic diagram of a characteristic pattern according to an embodiment of the disclosure.

An embodiment of the characteristic pattern of the disclosure is described below. Please referring to FIG. 4A, the characteristic pattern of the disclosure is composed of a plurality of parallel lines such as L1, L2, L3, L4, L5, L6, L7 and L8, and a plurality of curves such as C1, C2, C3 and C4. The plurality of parallel lines and the plurality of curves form a plurality of intersections. Wherein, the plurality of curves C1, C2, C3 and C4 are formed by having a same symmetrical center, for example, the plurality of curves may be circles having the same center. In other words, the plurality of curves are symmetrical to a center point. And the curvatures of the plurality of curves C1, C2, C3 and C4 are not equal to zero. The slopes of plurality of parallel lines are also not limited. The characteristic pattern of the disclosure (as shown in FIG. 4A) is a characteristic pattern having the property of point symmetry.

Figure 4B:
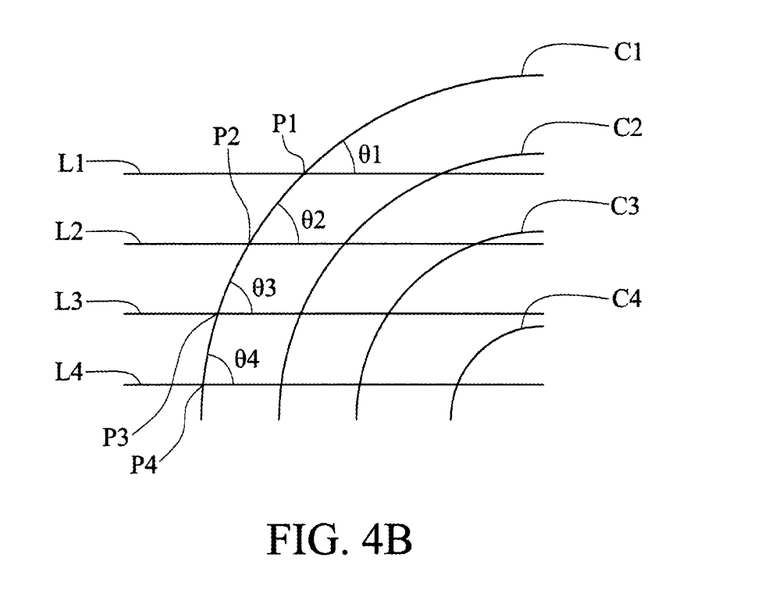
FIG. 4B is a partially enlarged schematic diagram of FIG. 4A.

Please referring to FIG. 4B, an intersection P1 is formed by the parallel line L1 and the curve C1, and an intersection P2 is formed by the parallel line L2 and the curve C1, and so on. Due to the curvatures of the plurality of curves are not equal to zero, the angles such as θ1~θ4, between the plurality of curves C1, C2, C3 and C4 and the plurality of parallel lines L1, L2, L3, L4 will be different. Therefore, when the plurality of intersections having the intersection angles such as θ1~θ4, are taken as characteristic points captured by the sensing unit, there is no problem with duplicate characteristic points. In other words, when the intersections P1~P4 are taken as characteristic points to be captured, the angles θ1~θ4 may be used to identify each of intersections P1~P4. Due to angles θ1~θ4 are all different and do not vary according to the size of the projecting domain, therefore the position information of each of intersections P1~P4 may be identified due to the position information is not repeated. This may enhance the accuracy of comparing the characteristic points. The scope of the disclosure does not impose limitations on the numbers of parallel lines and curves, and the characteristic pattern is not limited to the embodiment shown in FIG. 4A.

Figure 2:
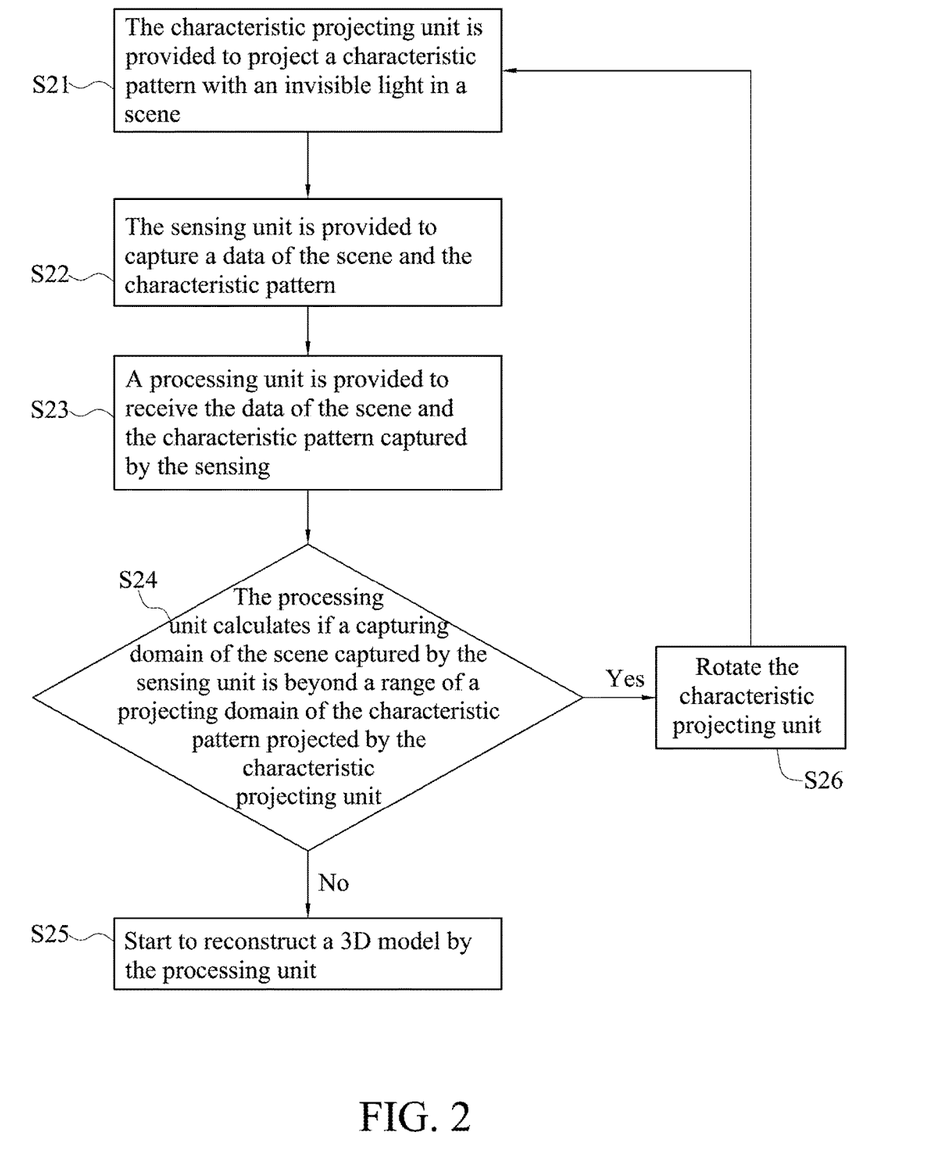
FIG. 2 is a flow chart of a scene scanning method according to another embodiment of the disclosure.

Please referring to FIG. 2 and FIG. 3, and FIG. 2 illustrates an operating flow of a scene scanning method of another embodiment of the disclosure by the scene scanning system 1 shown in FIG. 3. In the embodiment, the method comprises: providing the characteristic projecting unit 12 to project a characteristic pattern with an invisible light in a scene (Step S21); then, providing the sensing unit 11 to capture a data of the scene and the characteristic pattern (Step S22). After capturing the data of the scene and the characteristic pattern, the method further includes providing a processing unit 13 to receive the data of the scene and the characteristic pattern captured by the sensing unit 11 (Step S23).

After receiving the data of the scene and the characteristic pattern, the processing unit 13 calculates if a capturing domain of the scene captured by the sensing unit 11 is beyond an range of a projecting domain of the characteristic pattern projected by the characteristic projecting unit 12 (Step S24). This step determines whether the characteristic projecting unit 12 is rotated or not. If the capturing domain of the scene captured by the sensing unit 11 is beyond the range of the projecting domain of the characteristic projecting unit 12, then the operating flow enters the step S26 to rotate the characteristic projecting unit 12. After the characteristic projecting unit 12 has been rotated, the operating flow goes back to the step S21 to project the characteristic pattern by applying an invisible light in a new scene, which has the sensing unit 11 continuing to capture the data of the scene and the characteristic pattern. If the capturing domain of the scene captured by the sensing unit 11 is not beyond the range of the projecting domain of the characteristic pattern projected by the characteristic projecting unit 12, then the operating flow enters the step S25 that does not rotate the characteristic projecting unit 12 but starts to reconstruct a 3D model by the processing unit 13. A determining mechanism of rotating the characteristic projecting unit 12 will be further described below.

Figure 5A:
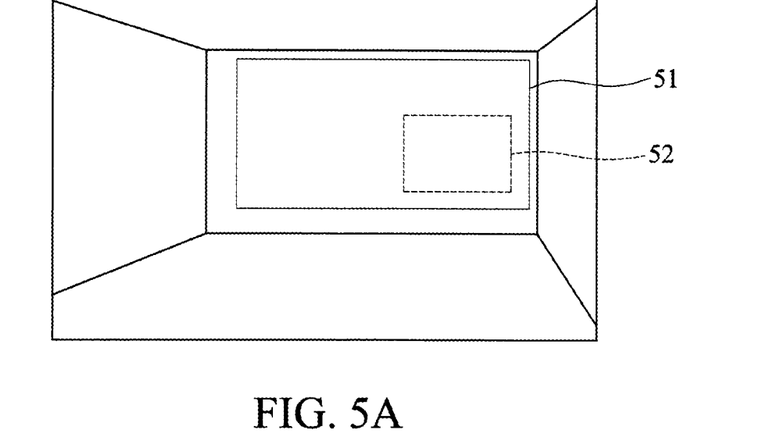
FIG. 5A is a situational schematic diagram of determining if rotating the characteristic projecting unit according to an embodiment of the disclosure.
Figure 5B:
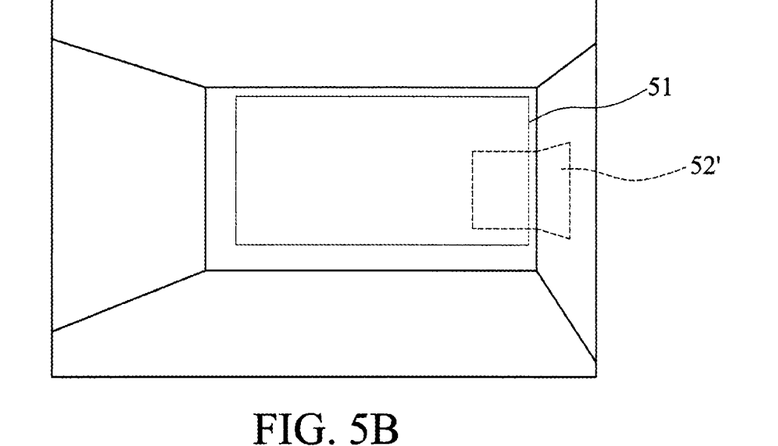
FIG. 5B is another situational schematic diagram of determining if rotating the characteristic projecting unit according to an embodiment of the disclosure.

Please referring to FIG. 5A and FIG. 5B, the characteristic projecting unit 12 projects a characteristic pattern in a scene, which forms a projecting domain 51. The sensing unit 11 has a capturing domain 52 in the scene. As shown in FIG. 5A, the capturing domain 52 completely falls into the projecting domain 51, therefore, it does not need to rotate the characteristic projecting unit 12. When the capturing domain 52 of the sensing unit 11 gradually moves, a part of the capturing domain 52' as shown in FIG. 5B is not within the projecting domain 51, that is, the capturing domain 52 is beyond the range of the projecting domain 51. Therefore, the characteristic projecting unit 12 is rotated, which is also meant that the projecting domain 51 is rotated, to have the capturing domain 52' falling into the projecting domain 51 again.

The processing unit 13 determines and controls the mechanism of rotating the characteristic projecting unit 12 (the mechanism of rotating the characteristic projecting unit is also referred to as a synchronization mechanism between the sensing unit 11 and the characteristic projecting unit 12). The mechanism of rotating the characteristic projecting unit is controlled and determined according to the number and the locations of a plurality of intersections in the characteristic pattern of the projecting domain 51 in the capturing domains 52 and 52', respectively.

Figure 6A:
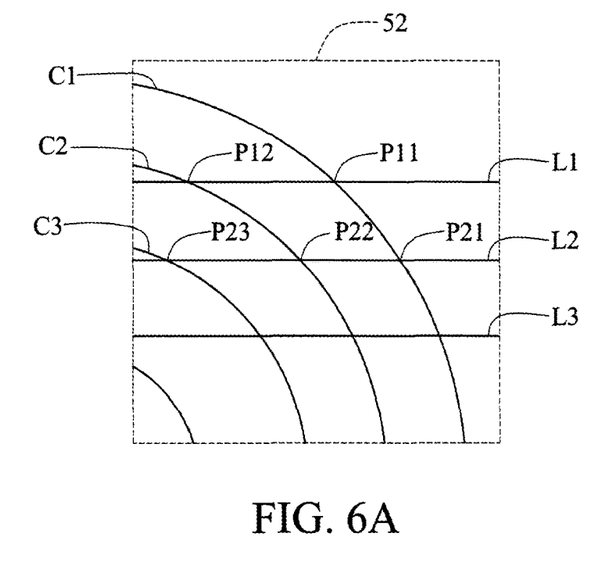
FIG. 6A is a schematic diagram of the Nth characteristic pattern captured by the sensing unit according to an embodiment of the disclosure.

Please referring to FIG. 5A, FIG. 5B, FIG. 6A and FIG. 6B. Assume that the characteristic pattern in the capturing domain 52 in the Nth frame is as shown in FIG. 6A. When the capturing domain 52 shown in FIG. 5A moves to the capturing domain 52' shown in FIG. 5B, the characteristic pattern in the capturing domain 52' in the N+1th frame will be shown as FIG. 6B. Due to angles of intersections P11, P12, P21, P22, P23 are all different, the position information of each intersection is not repeated. Therefore, the processing unit 13 may compare the intersection information in two neighboring frames (the Nth and the N+1th frames) easily, to determine whether the characteristic projecting unit 12 is rotated or not. For example, there are five intersections P11, P12, P21, P22, and P23 in FIG. 6A, while there are three intersections P11, P21, and P22 in FIG. 6B. From the variation of the number of the intersections, it may determine that the capturing domain 52' is beyond the range of the projecting domain 51, thereby rotating the characteristic projecting unit 12. The variation of the number of the intersections is one embodiment of determining whether the characteristic projecting unit 12 is rotated or not. In other embodiments of the disclosure, other properties of intersections also may be used to determine whether the characteristic projecting unit 12 is rotated or not, such as setting at least one specific intersection to be the boundary or at least one specific location of the projecting domain. Or the determination is performed according to a ratio of the capturing domain 52' to the projecting domain 51, for example, staring synchronization when the ratio is lower than 50%, but the scope of the disclosure is not limited thereto.

Figure 6B:
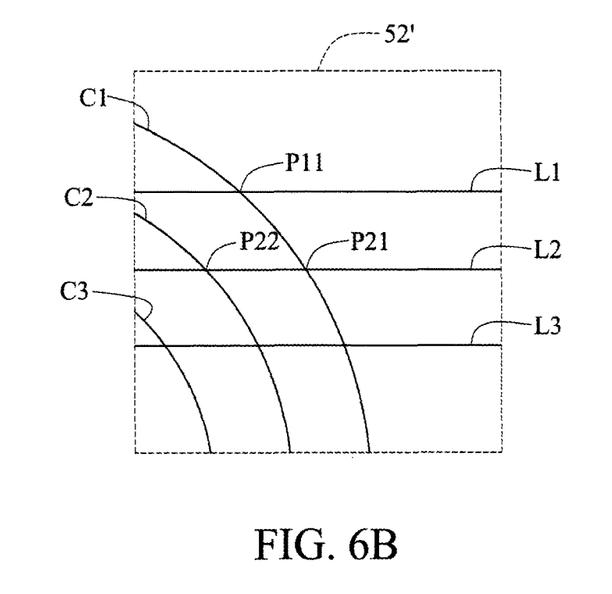
FIG. 6B is a schematic diagram of the Nth+1 characteristic pattern captured by the sensing unit according to an embodiment of the disclosure.

When rotating the characteristic projecting unit 12 is determined, the processing unit 13 needs to calculate the angle and the direction of the characteristic projecting unit 12 to be rotated. First, how to determine the direction is described. As shown in FIG. 6A and FIG. 6B, it may use an optical flow method to determine the moving direction of the intersections P11, P12, P21, P22, and P23. In FIG. 6A and FIG. 6B, the moving direction of intersections P11, P21, and P22 is toward left, which means that the moving direction of the capturing domains 52 and 52' is toward right. Then it may be seen that the rotating direction of the characteristic projecting unit 12 should be toward right.

Figure 5C:
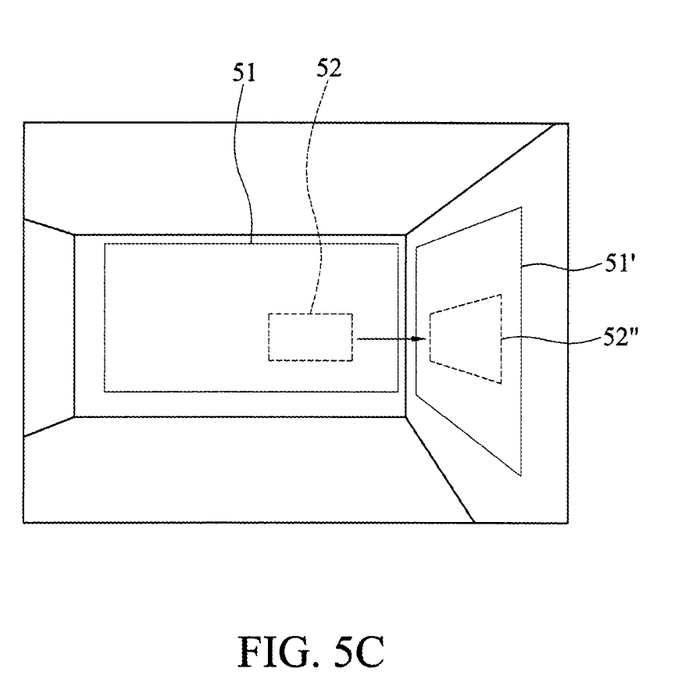
FIG. 5C is a situational schematic diagram of moving the projecting domain according to an embodiment of the disclosure.

For the calculation of the rotating angle, a horizontal rotation is taken as an example, assuming that the angle of the field of view of the characteristic projecting unit 12 is $\alpha$, and the number of characteristic points (intersections) projected by the characteristic projecting unit 12 in the horizontal direction is n. Therefore, the angle of distance between characteristic points is $\alpha/n$. Assuming that the number of characteristic points in the capturing domain 51 is m, when the characteristic projecting unit 12 is rotated to go across the whole characteristic pattern to another symmetrical end as shown in FIG. 5C, that is, moving the projecting domain 51 to the projecting domain 51', the number of characteristic points to go across is n−2m. Therefore, the angle of the characteristic projecting unit 12 needed to be rotated is $(n-2m)*(\alpha/n)$. In addition, if the number of characteristic points needed to move is m, wherein n is determined according to the number of characteristic points captured by the sensing unit 11 in the horizontal direction, then the rotating angle of the characteristic projecting unit 12 is obtained, which is $m*(\alpha/n)$. The calculating way mentioned above is just an embodiment of the disclosure, but the scope of the disclosure is not limited thereto. The scope of the disclosure is not limited to the horizontal rotation, the vertical or slanting rotation may be also applied to the embodiments of the disclosure.

In step S24, the processing unit 13 may continuously calculate if the capturing domain is beyond the range of the projecting domain until the whole information of the scene and the characteristic pattern is captured completely. At the time, the processing unit 13 enters step S25 to register and merge the data of the scene according to the data of the characteristic pattern to reconstruct the 3D model.

In the reconstructing operation of the 3D model, the characteristic projecting unit 12 will continuously project the characteristic pattern. The sensing unit 11 will continuously capture the data of the scene and the characteristic pattern in each frame, and transform the depth information of the scene to a point cloud. As described above, due to the intersections (characteristic points) of the characteristic pattern of the disclosure are not repeated, therefore, a specific intersection of the characteristic pattern in each current frame, such as the intersection P11 in the FIG. 6B, may be used to register and merge with the specific intersection in the previous frame, such as the intersection P11 in the FIG. 6A. That means the point clouds of previous and current frames are registered and merged.

When the situation that the characteristic projecting unit 12 must be rotated happens in the step S25, the operation of the sensing unit 11 is paused before rotating the characteristic projecting unit 12. After rotating the characteristic projecting unit 12 is done, the sensing unit 11 will resume operating, and the data of the scene and the characteristic pattern captured respectively before and after rotating the characteristic projecting unit 12, such as the point clouds of the Nth frame and the N+1th frame before and after pausing, respectively, is used for performing a match according to the characteristic pattern, so as to obtain the continuous data of the scene.

After the processing unit 13 obtains the continuous information, continuously reconstructing the 3D model usually produces accumulated errors. Therefore, the processing unit 13 may optimize the continuous data of the scene. For example, a bundle adjustment algorithm is used to optimize the point clouds to eliminate the accumulated errors and obtain a more accurate 3D model. The scope of the disclosure may be, but not limited to the bundle adjustment algorithm. Other algorithms used to optimize the point clouds may be applied to the disclosure.

According to the embodiments of the scene scanning method and system in the disclosure, the characteristic pattern projected by applying the invisible light is used to have the sensing unit capturing the data of the scene and the characteristic pattern at the same time. It helps the processing unit controlling if rotating the characteristic projecting unit and determining the rotating angle and the rotating direction according to the captured data. In addition, the characteristic pattern projected by applying the invisible light may help the registration and the merging between the point clouds of the previous and the current frames. It makes the data for reconstructing the 3D model of the scene more accurate and continuous, thereby effectively enhancing the quality of reconstructing the 3D model.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

What is claimed is:
1. A scene scanning method, adapted to obtain information for reconstructing a three-dimensional (3D) model, the method comprising:
projecting, by a characteristic projecting unit, a characteristic pattern by applying an invisible light in a scene, wherein the characteristic pattern is composed of a plurality of parallel lines, a plurality of curves and a plurality of intersections of the plurality of parallel lines and the plurality of curves, and the plurality of curves are symmetrical to a center point and a curvature of each of the plurality of curves are not equal to zero;

capturing, by a sensing unit, a data of the scene and the characteristic pattern; and receiving, by a processing unit, the data of the scene and the characteristic pattern captured by the sensing unit.

2. The scene scanning method according to claim 1, wherein the processing unit further calculates if a capturing domain of the sensing unit is beyond a range of a projecting domain of the characteristic projecting unit, and when the capturing domain is beyond the range of the projecting domain, the characteristic projecting unit is rotated to have the capturing domain being within the projecting domain.

3. The scene scanning method according to claim 2, wherein the processing unit calculates if the capturing domain of the sensing unit is beyond the range of the projecting domain of the characteristic projecting unit, and an angle and a direction for rotating the characteristic projecting unit are determined by a number and locations of the plurality of intersections in the characteristic pattern within the capturing domain.

4. The scene scanning method according to claim 1, wherein the sensing unit comprises two first optical elements and a second optical element, and a captured wavelength domain of the two first optical elements is the same as a wavelength domain of the characteristic projecting unit, and the second optical element is a red, green, and blue (RGB) camera.

5. The scene scanning method according to claim 4, wherein the two first optical elements are a combination of a projector and an image sensor, or the two first optical elements are image sensors.

6. The scene scanning method according to claim 1, further comprising a step of producing the 3D model, wherein the processing unit produces the 3D model by registering and merging the data of the scene according to the data of the characteristic pattern.

7. The scene scanning method according to claim 6, wherein performing the registering and merging of the data of the scene includes:

pausing an operation of the sensing unit before rotating the characteristic projecting unit; resuming the operation of the sensing unit after rotating the characteristic projecting unit is done; and using the data of the scene and the characteristic pattern captured by the sensing unit before and after rotating the characteristic projecting unit, respectively, to perform a match according to the characteristic pattern, so as to obtain a continuous data of the scene.

8. The scene scanning method according to claim 7, wherein the processing unit optimizes the continuous data of the scene to eliminate accumulated errors and obtain a more accurate 3D model.

9. A scene scanning system, adapted to obtain information for reconstructing a three-dimensional (3D) model, the system comprising:

a characteristic projecting unit, projecting a characteristic pattern by applying an invisible light in a scene, wherein the characteristic pattern is composed of a plurality of parallel lines, a plurality of curves and a plurality of intersections of the plurality of parallel lines and the plurality of curves, and the plurality of curves are symmetrical to a center point and a curvature of each of the plurality of curves are not equal to zero;

a sensing unit, capturing a data of the scene and the characteristic pattern; and a processing unit, receiving the data of the scene and the characteristic pattern captured by the sensing unit.

10. The scene scanning system according to claim 9, wherein the processing unit further calculates if a capturing domain of the sensing unit is beyond a range of a projecting domain of the characteristic projecting unit, and when the capturing domain is beyond the range of the projecting domain, the characteristic projecting unit is rotated to have the capturing domain being within the projecting domain.

11. The scene scanning system according to claim 10, wherein the processing unit calculates if the capturing domain of the sensing unit is beyond the range of the projecting domain of the characteristic projecting unit, and an angle and a direction for rotating the characteristic projecting unit are determined by a number and locations of the plurality of intersections in the characteristic pattern within the capturing domain.

12. The scene scanning system according to claim 9, wherein the sensing unit comprises two first optical elements and a second optical element, and a captured wavelength domain of the two first optical elements is the same as a wavelength domain of the characteristic projecting unit, and the second optical element is a red, green, and blue (RGB) camera.

13. The scene scanning system according to claim 12, wherein the two first optical elements are a combination of a projector and an image sensor, or the two first optical elements are image sensors.

14. The scene scanning system according to claim 9, wherein the processing unit produces the 3D model by registering and merging the data of the scene according to the data of the characteristic pattern.

15. The scene scanning system according to claim 14, wherein the processing unit pauses an operation of the sensing unit before rotating the characteristic projecting unit; resumes the operation of the sensing unit after rotating the characteristic projecting unit is done; and uses the data of the scene and the characteristic pattern captured by the sensing unit before and after rotating the characteristic projecting unit, respectively, to perform a match according to the characteristic pattern, so as to obtain a continuous data of the scene.

16. The scene scanning system according to claim 15, wherein the processing unit optimizes the continuous data of the scene to eliminate accumulated errors and obtain a more accurate 3D model.

* * * * *